UNITED STATES PATENT OFFICE.

NOAH WRINKLE AND WALTER A. KUHNERT, OF SAN FRANCISCO, CALIFORNIA.

METHOD OF OBTAINING POTASSIUM CHLORID.

1,311,481.    Specification of Letters Patent.    Patented July 29, 1919.

No Drawing.    Application filed December 26, 1918.    Serial No. 268,291.

*To all whom it may concern:*

Be it known that we, NOAH WRINKLE and WALTER A. KUHNERT, citizens of the United States, and residents of San Francisco, in the county of San Francisco and State of California, have invented Methods of Obtaining Potassium Chlorid, of which the following is a specification.

The present invention relates to improvements in methods of obtaining potassium chlorid from certain waters containing also borax and other salts. Such waters comprise inland lakes, solutions formed by dissolving in water salts deposited on the bottoms of dry lakes, and solutions formed by dissolving in water salts obtained by evaporation of waters of such inland lakes.

One object of the invention is to provide such a method which will be economical and efficient. A further object is to recover separately certain of the other salts, and particularly the borax.

Waters to which it is intended to apply our improved process, may, and many do, contain such minerals as sodium carbonate, sodium bicarbonate, sodium sulfate, sodium chlorid, sodium borate and other minerals in addition to potassium chlorid. Among such waters is that from Searles Lake in California of which the following is the composition:—

| | |
|---|---|
| $Na_2CO_3$ | 4.10% |
| $Na_2SO_4$ | 6.60 |
| NaCl | 7.20 |
| KCl | 4.00 |
| $Na_2B_4O_7$ | 1.03 |
| Water | 77.07 |

Also that from Owens Lake in California of which the following is the composition:—

| | |
|---|---|
| $Na_2CO_3$ | 8.50% |
| $Na_2SO_4$ | 3.02 |
| NaCl | 9.06 |
| KCl | 6.00 |
| $Na_2B_4O_7$ | 3.60 |
| Water | 69.92 |

In the preliminary treatment of such waters, before our improved process is applied, we may eliminate nearly all the sodium carbonate by treating the liquor with carbon dioxid to form sodium bicarbonate, which is partially insoluble in the solution, and then removing the insoluble bicarbonate from the solution. This is the preferred method when it is desired to recover sodium bicarbonate as a by-product. When recovery of sodium bicarbonate freed from other salts is not desired, the concentration of the solution is proceeded with by evaporation, for which there may be used either natural heat, that is, exposure to the sun, or artificial heat.

Either with or without the preliminary removal of sodium bicarbonate as a by-product, the solution is concentrated by evaporation and thereby the proportion of potassium chlorid therein is increased and at the same time some of the more insoluble salts may be eliminated; or there may be obtained a crude potassium chlorid by permitting the solution to cool with the deposition of crystals of potassium chlorid and other salts. In this manner there has been obtained from the waters of Searles Lake the following composition:—

| | |
|---|---|
| $Na_2CO_3$ | 1.70% |
| $Na_2SO_4$ | 0.44 |
| NaCl | 10.93 |
| KCl | 66.34 |
| $Na_2B_4O_7$ | 10.91 |
| Water | 9.66 |

While our preferred method of preliminary treatment is to first obtain a crude salt having a comparatively high content of potassium chlorid and then to proceed with the removal of the borax and thereafter remove as much of the remaining salts as may be desired, yet the first or preliminary step above mentioned may be omitted.

In treating crude potassium salts containing borax we first dissolve the same in water and apply the same method for removing borax from the solution as we apply in treating natural water.

This method is as follows:—

Having a solution containing potassium chlorid, borax, sodium chlorid and other salts, the quantity of each being immaterial, though it is preferred that the solution be highly concentrated in potassium chlorid, we treat the solution with an excess of magnesium oxid by adding it to the solution, either in the form of a powder or in the form of a sludge suspended in water, and then highly agitate the mixture, either by mechanical agitation or by boiling. A reaction takes place which may probably be expressed as follows:—

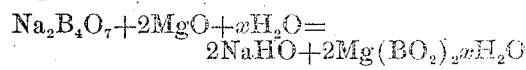

Or else as follows:—

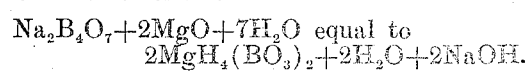

Whatever be the nature of the reaction, there is formed a boric magnesium compound which is practically insoluble in water and in solutions containing chlorids of potassium or sodium. Its formation occurs both in hot and in cold solutions, although we find it to be easier if the solution be hot, to remove by filtration the insoluble matter formed together with the excess of magnesium oxid. The insoluble boric magnesium compound and the excess of magnesium oxid is removed from the solution by filtration or other means.

It may be noted that the substitution of calcium oxid for magnesium oxid to achieve the same result is useless, and that the mere presence of calcium oxid, as a contamination of the magnesium oxid used, vitiates the result sought to be obtained in direct proportion to the degree of such contamination.

The same result may be obtained, but at greater expense, by first treating the solution with an acid to decompose the borax and form boric acid and then adding the magnesium oxid in the manner above stated.

The mixture of the insoluble excess of magnesium oxid and the boric magnesium compound which have been removed from the solution is now treated with a solution of sodium hydrate. This dissolves the borate component of the borate magnesium compound, and leaves the magnesium oxid insoluble in the sodium hydrate solution. This, after being washed with fresh water to remove the adhering sodium hydrate, is used to remove boric acid from the borax contained in other solutions undergoing treatment. We find that the magnesium oxid may be repeatedly used, and we believe it could be so re-used indefinitely, although, owing to the presence of organic matter in inland lake waters and salts obtained therefrom, we anticipate that ultimately it may be necessary to destroy the accumulated organic matter and to eliminate the absorbed carbon dioxid by subjecting the magnesium oxid to the action of heat. The excess of sodium hydrate solution can also be used repeatedly, after evaporation and after separating therefrom the borax and carbonates. Ordinarily one treatment of the solution with magnesium oxid effects the removal of about 90% of the boric acid of the borax contained in such solutions, and the solubility of the remaining boric acid is diminished by the addition to the solution, while undergoing treatment with magnesium oxid, of sufficient bicarbonate of soda, (or carbon dioxid in gaseous form) to convert the sodium hydroxid, resulting from the decomposition of the borax in the solution, to sodium monocarbonate.

The original solution, after being treated as described above for borate removal, is evaporated and permitted to deposit crystals of potassium chlorid, which are removed from the mother liquor and further treated as may be required to separate therefrom adhering mother liquor and sodium chlorid and other contaminating salts.

We claim:—

1. The method which consists in adding to a solution containing potassium chlorid and a boric compound a sufficient amount of magnesium oxid to effect the decomposition of the boric compound and cause the formation of a boric magnesium compound insoluble in the solution.

2. The method which consists in adding to a solution containing potassium chlorid and a boric compound a sufficient amount of magnesium oxid to effect the decomposition of the boric compound and cause the formation of a boric magnesium compound insoluble in the solution, and removing from the solution the insoluble matters therein.

3. The method which consists in adding to a solution containing potassium chlorid and a boric compound a sufficient amount of magnesium oxid to effect the decomposition of the boric compound and cause the formation of a boric magnesium compound insoluble in the solution,—removing from the solution the insoluble matters therein, adding said insoluble matters to a solution of sodium hydrate, and separating the soluble borate component of the boric magnesium compound from the magnesium component thereof.

4. The method which consists in adding to a solution containing potassium chlorid and a boric compound a sufficient amount of magnesium oxid to effect the decomposition of the boric compound and cause the formation of a boric magnesium compound insoluble in the solution, removing from the solution the insoluble matters therein, adding said insoluble matters to a solution of sodium hydrate, separating the soluble borate component of the boric magnesium compound from the magnesium component thereof and using the insoluble mass so recovered in a repetition of the method of removal of the boric compound from a solution containing potassium chlorid.

5. The method which consists in adding to a solution containing potassium chlorid and a boric compound a sufficient amount of magnesium oxid to effect the decomposition of the boric compound and cause the formation of a boric magnesium compound insoluble in the solution, removing from the solution the insoluble matters therein, adding said insoluble matters to a solution of sodium hydrate, separating the soluble borate component of the boric magnesium compound from the magnesium component thereof, evaporating the sodium hydrate solution to separate borax therefrom, and evaporating the original solution, after removal of the insoluble matter, to crystallize the potassium chlorid therein.

NOAH WRINKLE.
WALTER A. KUHNERT.